(12) United States Patent
Mnushkin (10) Patent No.: US 9,770,701 B2
(45) Date of Patent: Sep. 26, 2017

(54) CONTACT DEVICE FOR HEAT/MASS EXCHANGE AND PHASE SEPARATION

(71) Applicant: Igor Anatol'evich Mnushkin, Ufa (RU)

(72) Inventor: Igor Anatol'evich Mnushkin, Ufa (RU)

(*) Notice: Subject to any disclaimer, the term of this patent is extended or adjusted under 35 U.S.C. 154(b) by 0 days.

(21) Appl. No.: 15/519,276

(22) PCT Filed: Oct. 20, 2015

(86) PCT No.: PCT/RU2015/000691
§ 371 (c)(1),
(2) Date: Apr. 14, 2017

(87) PCT Pub. No.: WO2016/060593
PCT Pub. Date: Apr. 21, 2016

(65) Prior Publication Data
US 2017/0239639 A1      Aug. 24, 2017

(30) Foreign Application Priority Data
Oct. 17, 2014   (RU) ................................ 2014141852

(51) Int. Cl.
*B01J 19/32*      (2006.01)
*B01D 11/04*      (2006.01)
(Continued)

(52) U.S. Cl.
CPC ............... *B01J 19/32* (2013.01); *B01D 3/26* (2013.01); *B01D 11/043* (2013.01);
(Continued)

(58) Field of Classification Search
CPC  B01J 19/006; B01J 19/32; B01J 2219/00777; B01J 2219/32272;
(Continued)

(56) References Cited

U.S. PATENT DOCUMENTS 4,582,569 A * 4/1986 Jenkins ................... B01D 3/141
196/111
5,536,454 A * 7/1996 Fujii ....................... B01D 53/18
261/112.1

(Continued)

FOREIGN PATENT DOCUMENTS

RU      2 049 542 C1    12/1995
RU      2 505 354 C1    1/2014
SU      1562022  A1     5/1990

*Primary Examiner* — Charles Bushey
(74) *Attorney, Agent, or Firm* — Birch, Stewart, Kolasch & Birch, LLP (57) ABSTRACT

The invention relates to packed contact devices used in heat/mass exchange column apparatuses in which the processes of rectification, distillation, absorption, and extraction are run, and can be applied in the oil refining, petrochemical, chemical, gas-processing, and food-manufacturing industries. A contact device for carrying out heat/mass exchange and separation of phases in sectional cross-flow packed columns in gas/liquid and liquid/liquid systems comprises a plurality of identical contact elements assembled one upon another in one or more rows in blocks held together by spokes and vertical posts, with formation of walls in the column body that are restricted on horizontal end faces by horizontal segmental baffles conjugated in an arc with the column body; thereat, arranged between the walls are liquid distributors having a perforated part, an additional baffle, deflector plates, and vertical support plates. The space between the lower and upper walls is sealed by means of battens.

14 Claims, 4 Drawing Sheets

(51) Int. Cl.
*B01D 3/26* (2006.01)
*B01J 19/00* (2006.01)

(52) U.S. Cl.
CPC .... *B01J 19/006* (2013.01); *B01J 2219/00777* (2013.01); *B01J 2219/32268* (2013.01); *B01J 2219/32272* (2013.01)

(58) Field of Classification Search
CPC .... B01J 2219/32268; B01D 3/14; B01D 3/26; B01D 11/043; B01D 53/14; B01D 53/18; B01D 53/185; F28C 3/00
USPC .............................. 261/97, 110, 112.1, 112.2
See application file for complete search history.

(56) References Cited

U.S. PATENT DOCUMENTS

| | | | |
|---|---|---|---|
| 6,357,728 B1 | 3/2002 | Sunder et al. | |
| 8,240,640 B2* | 8/2012 | Nakayama | B01D 3/141 |
| | | | 261/109 |
| 2013/0069254 A1* | 3/2013 | Zaman | B01D 3/28 |
| | | | 261/108 |
| 2014/0345460 A1* | 11/2014 | Koppen | B01D 53/18 |
| | | | 95/261 |

* cited by examiner

CONTACT DEVICE FOR HEAT/MASS EXCHANGE AND PHASE SEPARATION

TECHNICAL FIELD

The invention relates to packed contact devices used in heat/mass exchange column apparatuses in which the processes of rectification, distillation, absorption, and extraction are run, and can be applied in the oil refining, petrochemical, chemical, gas-processing, and food-manufacturing industries.

PREVIOUS TECHNICAL KNOWLEDGE

In one prior art embodiment of the invention, a hydrocarbon fractionation unit contains a rectification column whose inlet is connected to feedstock supply line, which is equipped with a heat exchanger, preheater, and feed surge drum; column top is connected to the propane-butane fraction discharge line equipped with an air cooler and fractional distillation tube, and column bottom is connected to the pentane-hexane fraction discharge line, which in its turn is connected to the heat exchanger; the unit is notable for additionally containing a condenser-cooler installed in parallel to the pentane-hexane fraction discharge line upstream of the air cooler, with a regular cross-flow packing installed in the rectification column (A hydrocarbon fractionation unit: certificate No. 54805 Russian Federation. No. 2005135804/22; appl. dated Nov. 17, 2005; publ. dated Jul. 27, 2006). A drawback of this patent is the absence of design features characteristic of a regular cross-flow packing, whereas a rectification column diagram given in FIG. 1 allows to assume that the authors were considering a counter-flow packed column.

In the second prior art embodiment of the invention, a mass exchange cross-flow packed column includes a body, installed in which is a packing divided into sections by horizontal baffles with holes for gas and liquid passage, distinguished in that a frame with vertical posts is installed on column bottom support elements in the central part of the body, with packing sections arranged between the posts in such a way that the sections, together with the horizontal baffle plates, form lateral segments, in which inspection hatches are made (A mass exchange cross-flow packed column: certificate No. 18646 Russian Federation. No. 2000130295/20; appl. dated Dec. 16, 2000; publ. dated Jul. 10, 2001). A drawback of this patent is the narrow working range of contact device steady operation, because in case of reduction of the liquid phase flow rate, the hydrodynamics of liquid film flow over the packing surface is disturbed, accompanied by jet interruptions and a possibility of gaseous phase breakthrough through the contact device without contacting the liquid phase, which will reduce efficiency of heat/mass exchange in the packing, and with the increase of liquid phase flow rate, due to growing hydraulic resistance, breakaway of part of the liquid film from the packing surface on the outside of the section is inevitable through splitting up of the broken-away liquid film into drops by the ascending gas current, followed by a corresponding liquid product portion being thrown onto the upper contact device, which will result in deterioration of the initial stock separation in the column as a whole.

The third prior art embodiment of the invention offers a technique for contact of fluids in a three-dimensional structured element, which includes supply of fluids into the element; contact of the fluids within the volumes and on the surface of macro- and microstructures; organization, within the microstructure, of a fully-wetted flow of at least one of the fluids; provision for this flow movement under the action of one or more fields of force; discharge of fluid from the microstructure and of another fluid—from the macrostructure, in which case gravity or electric field is considered as the field of force (A technique for contact of fluids in a three-dimensional structured element: pat. 2186617 Russian Federation. No. 2000117493/12; appl. dated Dec. 16, 2000; publ. dated Jul. 10, 2001). A drawback of this technique is that no characteristic dimensions of micro- and macrostructures are given that could relate the elements of packing design, which are essentially a system of parallel-sided plates, to a corresponding kind of structures; besides, from the positions of mass transfer in a gas/liquid system, mass transfer occurs in the thin boundary layer film between the flows of gas and liquid, which alone can be regarded as the microstructure, whereas both the liquid phase film on the plate and the gaseous phase flow between the plates should be regarded as the macrostructure. As liquid phase is flowing over the surface of contact device plates, especially when the latter are vertically arranged, disturbance of film-like flow of the liquid phase can be possible, with liquid film breakaway from the surface of the plates, followed by a corresponding liquid product portion being thrown onto the upper contact device, which will deteriorate the initial stock separation in the column as a whole.

In the fourth prior art embodiment of the invention, a packing for mass exchange consists of alternating flat and corrugated sheets, which contact each other in such a way that part of corrugated sheet projections form a clearance with the flat sheet; the packing is distinguished in that for the purpose of intensifying heat/mass exchange due to elimination of stagnation zones, reduction of drift, and reduction of specific amount of metal, the corrugations are arranged at an angle of 60 degrees to the flat sheet, and the ratio of corrugation pitch to the distance between the flat sheets is 0.7-0.8; thereat, the adjacent rows feature the opposite corrugating direction, and the sheets can be made from mesh (A packing for mass exchange columns: pat. 1562022 SU No. 4483584/31-26; appl. dated Jul. 22, 1988; publ. dated May 7, 1990; Bulletin No. 17). A drawback of this patent is that the corrugated sheets are made from mesh, which renders shaping of the packed contact device more complicated due to insufficient strength of the mesh.

Also well-known are the options of regular packings for heat/mass exchange apparatuses:

a) a regular packing consisting of a block of corrugated sheets made of solid or perforated sheet metal, with said sheets having holes made in the protruding part of the corrugations and the distance between the holes being equal to corrugation pitch; thereat, the protruding parts of the corrugations enter the holes in the adjacent sheet, forming clearances between hole edge and this part of the corrugations; the packing being distinguished in that the block consists of corrugated sheets made of solid or perforated sheet metal and alternating with corrugated sheets made of solid or perforated sheet metal having holes, the latter made in the protruding parts of the corrugations facing both adjacent corrugated sheets made of solid or perforated sheet metal, b) a regular packing for heat/mass exchange apparatuses, consisting of a block of corrugated sheets made of solid or perforated sheet metal, with said sheets having holes made in the protruding part of the corrugations and the distance between the holes being equal to corrugation pitch; thereat, the protruding parts of the corrugations enter the holes in the adjacent sheet; the packing being distinguished in that the block consists of corrugated sheets made of solid or perforated sheet metal and alternating with corrugated sheets made of solid or perforated sheet metal of rectangular or trapezoidal section with holes, the latter made in the protruding parts of the corrugations facing both adjacent corrugated sheets made of solid or perforated sheet metal, with said holes corresponding in shape to the adjacent corrugated sheet section and the end-face part of corrugations between the holes having a slot (A regulating packing (options): pat. 2505350 Russian Federation. No. 2012142327/05; appl. dated Dec. 16, 2000; publ. dated Jul. 10, 2001). A drawback of this patent is a total impossibility to use this packing as a cross-flow contact device when the corrugated sheets are made from solid sheet metal due to a possibility to only implement a counter-flow mode of liquid and vapor phases organization, while in case of the corrugated sheets being made from perforated sheet metal, cross-flow organization of liquid and vapor phases will be inefficient due to the inevitable restriction on vapor phase flow in the mass exchange apparatus because of small flow area for the vapor phase, which has to pass through perforation of the corrugated sheets whose clear area is normally equal to 0.05-0.1 of sheet area and cannot exceed the value of 0.22, which will result in necessity to sharply increase the dimensions and specific amount of metal of the contact device and the mass exchange apparatus as a whole when implementing the cross-flow scheme.

Also well-known is a heat/mass exchange cross-flow packed column, which includes a body with packing arranged in it, the packing being divided into sections by horizontal baffles with holes for passage of vapor (gas) and liquid. In accordance with the invention, horizontal section of the column at each stage of contact is divided into sections consisting of vapor (gas) inlet zone, zone of vapor (gas) contact with liquid, and zone of liquid cross-flow to the downstream stage and vapor (gas) cross-flow to the upstream stage, and producing within the column volume a screw motion of liquid and vapor (gas) flows about its vertical axis, with the degree of liquid and vapor (gas) sectioning being similar and equal to the number of sections on the stage of contact (A heat/mass exchange cross-flow packed column: pat. 2049542 Russian Federation. No. 5047133/26; appl. dated Jun. 11, 1992; publ. dated Dec. 10, 1995). This invention has the following drawbacks:

the absence of an accumulation zone for reflux flowing off into liquid phase distributor from the upper section and, as a consequence, filling of the bottom part of this section's packing with liquid phase, which leads to reduced mass-exchange efficiency of the section and column as a whole, as well as to extra investment costs due to the idle bottom part of this section's packing immersed in liquid;

in case of reflux flow rate increase, liquid phase overflow through section flange of the packing into the vapor (gas) cross-flow zone instead of the liquid cross-flow zone, which disturbs the hydrodynamic conditions of column operation;

the inevitability of homogeneity disturbance of the films of liquid phase flowing off over the packing surface in case of considerable section dimensions of the packing in high-capacity and large-diameter mass-exchange apparatuses due to considerable manifestation thereat of diffusive character of liquid phase local streams flow, which will lead to formation of zones on the packing surface where there is no liquid phase flow-off and, accordingly, no mass exchange between flowing-off liquid and vapor (gas).

DISCLOSURE OF INVENTION

In making of the invention, the task was set to simultaneously improve the design of a cross-flow contact device for the purpose of intensifying heat/mass exchange due to lower probability of formation of bypass streams of liquid phase flowing off over a regular packing; enable application of a cross-flow contact device not only in gas/liquid systems, but also in liquid/liquid systems; enable application of a counter-flow contact device in a large-diameter mass-exchange apparatus; and simplify the technology of cross-flow contact device mounting in the mass-exchange apparatus.

The set task is solved on account that a contact device is provided for carrying out heat/mass exchange and separation of phases in sectional cross-flow packed columns in gas/liquid and liquid/liquid systems, which device includes an aggregate of identical contact elements assembled in a block, in which they are arranged in parallel to each other; thereat, blocks of identical contact elements assembled one upon another in one or more rows and held together by spokes and vertical posts, form various solid figures, which are restricted on horizontal end faces with horizontal segmental baffles conjugated in an arc with the column body. Arranged between the lower end face of the upper wall and the upper end face of the lower wall is an additional baffle, which is partially conjugated with a corresponding horizontal segmental baffle acting as a distributor for the liquid downflow and made in the form of a plate with free end bent upward in gas/liquid systems (a) and in liquid/liquid systems with dispersion of high-density liquid in the packing (b), and bent downward in systems with dispersion of high-density liquid in the packing (c), the bent free end forming a pressure strip. The bottom of liquid distributor plate is fitted with a perforated part arranged along the vertical projection of the wall; for systems (a) and (b), perforated parts of the plate are separated by rows of deflectors, parallel to wall width, attached to the bottom at an acute angle to the plate and facing the stream of gas or light liquid, while from above the perforated part of the plates is divided into rows, parallel to wall length, by vertical support plates, on which the blocks are resting, with formation of a clearance between the upper wall elements and perforated part of the distributor. For system (c), perforated parts of the plates are separated by rows of deflector plates parallel to wall width, attached to the bottom at an acute angle to the plate and facing the stream of high-density liquid, while from below the perforated part of the plates is divided into rows, parallel to wall length, by vertical support plates, on which the blocks are resting, with formation of a clearance between the lower wall elements and perforated part of the distributor. The space between the additional plate and the lower and upper walls is sealed by means of battens which prevent gas in the gas/liquid systems or continuous liquid phase in the liquid/liquid systems from penetration through the wall. Such arrangement of the contact device enables the following:

due to assembly of the necessary number of blocks in the wall in several rows by width, height, and length, it becomes possible to redistribute liquid phase streams during its cross-flow from one block into another by wall height and equalize liquid phase local flows by blocks, which improves heat/mass exchange efficiency factor of the contact device under otherwise equal conditions;

the pressure strip of liquid phase special distributor, arranged between the adjacent walls, enables to ensure the necessary liquid level making up for pressure difference in the upper and lower walls of the contact devices, while simultaneously forming a hydrolock for the distributor;

availability of a special distributor of the liquid phase, which is arranged between the adjacent walls, enables to stabilize reflux flow on the lower wall across the entire normal section of the packing, because, besides the perforated part, the bottom of liquid distributor plate is equipped with rows of deflector plates parallel to wall width, attached to the bottom at an acute angle to the plate and facing the stream of gas; thereat, each row of the holes in the distributor plate perforated part has an individual deflector, due to which the stream-droplet reflux flow is converted into film-like flow through perforated part of the distributor plate, which ensures a more uniform packing reflux in the lower wall;

the horizontal segmental baffles conjugated in an arc with the column body, liquid phase distributor, and battens provide a system of hydrolocks delimiting separate movement of two phases: vapor and liquid or liquid and liquid ones.

It is expedient to ensure that identical contact elements represent a permeable corrugated plate with corrugation tilt angle of 45-60 degrees to the horizontal plane, which ensures a uniform continuous flow-off of liquid phase over the surface of a permeable corrugated plate; moreover, with liquid phase viscosity factor increasing, corrugation tilt angle shall be increased accordingly. The permeable corrugated plates can be made from an expanded plate 0.3-0.5 mm thick, with formation of diamond-shaped mesh openings with strand size 4-12 mm and strand thickness 0.5-2.0 mm, which provides permeable corrugated plate clear area at a level no less than 0.3.

It is also expedient to ensure that the corrugations of adjacent permeable corrugated plates are offset to 90 degrees and have contact with each other through corrugation crests, forming cavities with dimensions 3-5 times larger than those of the strand of permeable corrugated plate openings, with variable-section channels for passage of gaseous phase and second liquid phase formed between the adjacent permeable corrugated plates, which facilitates eddy formation in those phases and intensifies heat/mass exchange between them.

It is also practical to ensure that vertical posts used for holding together the blocks of identical contact elements in a common wall are in the form of channel member whose cheeks touch the wall and have contact with pressure strip of the distributor, forming a channel for liquid cross-flow, without overflowing, through the pressure strip, which enables to move at least part of the excess liquid phase flowing off over the outer surface of the upper contact device wall to the lower contact device.

It is necessary to have the pressure strip height in millimeters greater than the loss of pressure head of gas in the gas/liquid systems or low-density liquid in the liquid/liquid systems while said gas or liquid pass through the wall perpendicularly to the high-density liquid stream flowing down, or than the loss of pressure head of high-density liquid in the liquid/liquid systems while said liquid passes through the wall perpendicularly to the low-density liquid stream floating up in the liquid/liquid systems, expressed in millimeters of, respectively, high- or low-density liquid to guarantee surmounting of pressure difference between the upper and lower walls, which ensures liquid phase distributor operation.

It is expedient to ensure that the value of acute angle of the rows of deflectors to the plate facing the stream of gas in the gas/liquid systems or low-density liquid in the liquid/liquid systems is determined by the factors of viscosity and surface tension of the liquid downflow and provision of transition of liquid flowing down in the gas/liquid systems or low-density liquid floating up in the liquid/liquid systems from the mode of droplet flow through the holes in the perforated part of liquid distributor plate into the mode of film-like liquid flow over deflector plate, producing a uniform outflow of liquid along the entire length of deflector plate lower edge, which ensures sufficiently uniform reflux on the lower wall contact elements across the wall width.

It is also expedient to have a 1:(1÷2):(2÷10) ratio of block height, width, and length, which enables to arrange contact device wall using one or two standard-size blocks, irrespective of the dimensions of mass-exchange cross-flow packed column, which renders designing and manufacturing of the latter considerably less expensive.

The design flexibility of a mass-exchange cross-flow packed column is ensured by a possibility to have standard cross-section of the wall assembled from blocks in a rectangular, triangular, T-shaped or square configuration in accordance with optimization of the contacting phases in particular technological processes.

The efficiency of heat/mass transfer in sectional cross-flow packed columns in gas/liquid and liquid/liquid systems is ensured by provision of at least 80% of free cross-section of the wall, formed by the space between the corrugations of adjacent permeable corrugated plates and the free space of the permeable corrugated plates themselves. The same purpose is served by an arrangement consisting in that the blocks of identical contact elements, assembled one upon another in several rows, form a wall in the column section, with one row of the blocks offset relative to another by wall height, width, and length, because in that case liquid phase from the upper block of identical contact elements migrates into two lower blocks, which leads to balancing of liquid phase components concentration in the standard cross-section of the wall on the whole; thereat, the offset of one row of the blocks relative to another can amount to 0.1-0.5 of block height, depending on the ratio of the dimensions of blocks forming the wall.

It is expedient to have identical contact elements fixed to each other by means of spot welding or stitched together by spokes with blanked ends so as to ensure mechanical strength of the block during its manufacture, transportation, mounting of the cross-flow packed column, and in the course of its operation, with mounting of the mass-exchange wall performed from packing blocks immediately in the column section.

LIST OF DRAWINGS

The claimed invention is illustrated in the drawings, where

1—column body;
2—contact device in the form of a wall;
3—pressure strip;
4—vertical support plates;
5—perforated part of liquid distributor plate;
6—deflector plates;
7—horizontal segmental baffle;
8—batten;
9—vertical posts;

10—spokes;
11—blocks of identical contact elements.

BRIEF DESCRIPTION OF DRAWINGS

The contact device for heat/mass exchange in sectional cross-flow packed columns functions as follows: Gas entering column body 1 moves upwards. While spreading uniformly, gas horizontally enters the contact device, where the contact with liquid occurs. Stream of liquid from the contact device uniformly flows off over the surface of a permeable corrugated plate of liquid distributor 5, moving from one block to another. The blocks consisting of identical contact elements 11 form a wall. Thereat, movement of the vapor and liquid phases occurs separately, because horizontal segmental baffles 7 are provided.

Figure 1:
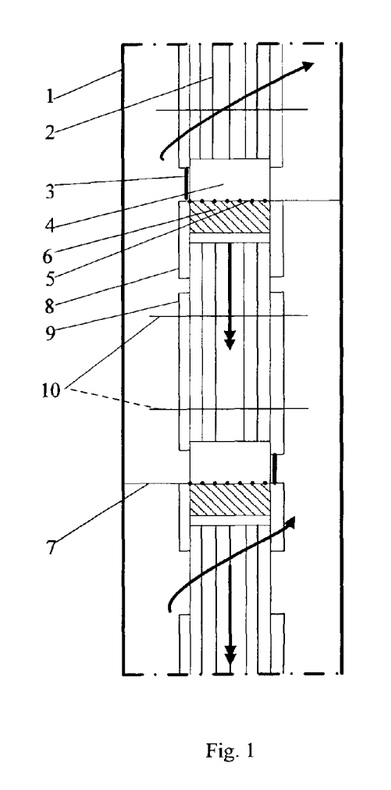
FIGS. 1-5 present the designs of a contact device for carrying out heat/mass exchange and separation of phases in sectional cross-flow packed columns in gas/liquid and liquid/liquid systems, as well as its individual elements with the following designations.

Shown in FIG. 1 is a fragment of a sectional cross-flow packed column intended for separation of gas/liquid or liquid/liquid systems, wherein single arrows indicate gas passage for a gas/liquid system or low-density liquid for a liquid/liquid system, and double arrows indicate liquid passage for a gas/liquid system or high-density liquid for a liquid/liquid system. A light phase, such as gas, when entering column body 1, passes through a contact device in the form of wall 2, consisting of blocks of identical contact elements, representing a set of corrugated perforated plates over which the liquid phase is flowing off. From the block consisting of identical contact elements, liquid flows off into a distributor representing a perforated part of the plate and pressure strip 3; the latter provides for creation on the distributor of a liquid phase layer of such a height that allows to surmount hydraulic resistance of the liquid phase passing through the distributor and pressure difference between the adjacent upper and lower walls. Installed above the perforated part of the plate of liquid distributor 5 are vertical support plates 4, on which upper walls 2 are installed. Installed under the perforated part of the plate of liquid distributor 5 are deflector plates 6 intended to provide for uniform spreading of liquid over the lower wall contact device. Horizontal segmental baffles 7 divide the space of column body 1 in such a way that sections with gaseous phase cross-flow through corresponding contact device in the form of wall 2 are formed in column body 1. To seal the space of the contact device in the form of wall 2 in the liquid phase feed zone, battens 8 are used. The blocks of identical contact elements are fixed in the contact device in the form of wall 2 by means of vertical posts 9 and spokes 10.

Figure 2:
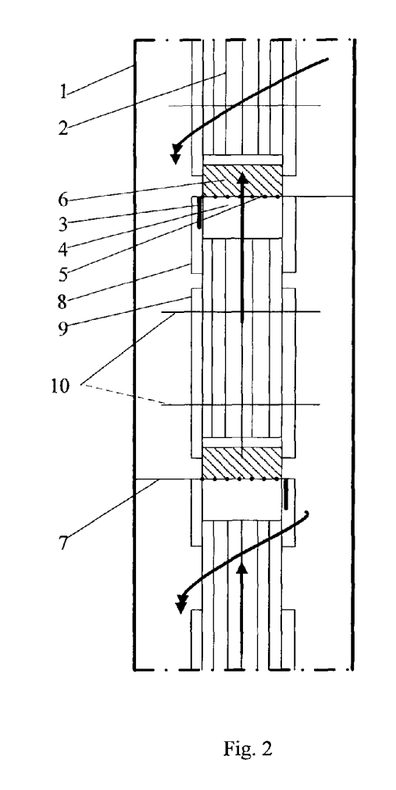

Shown in FIG. 2 is a fragment of a sectional cross-flow packed column intended for separation of a liquid/liquid systems, wherein single arrows indicate low-density liquid passage and double arrows indicate high-density liquid passage. Contrary to FIG. 1, vertical support plates 4 are arranged under the perforated part of the plate of liquid distributor 4 for low-density liquid, deflector plates 6 are arranged above the perforated part of the distributor plate, and pressure strip 3 is facing down towards the ascending flow of low-density liquid.

Figure 3:
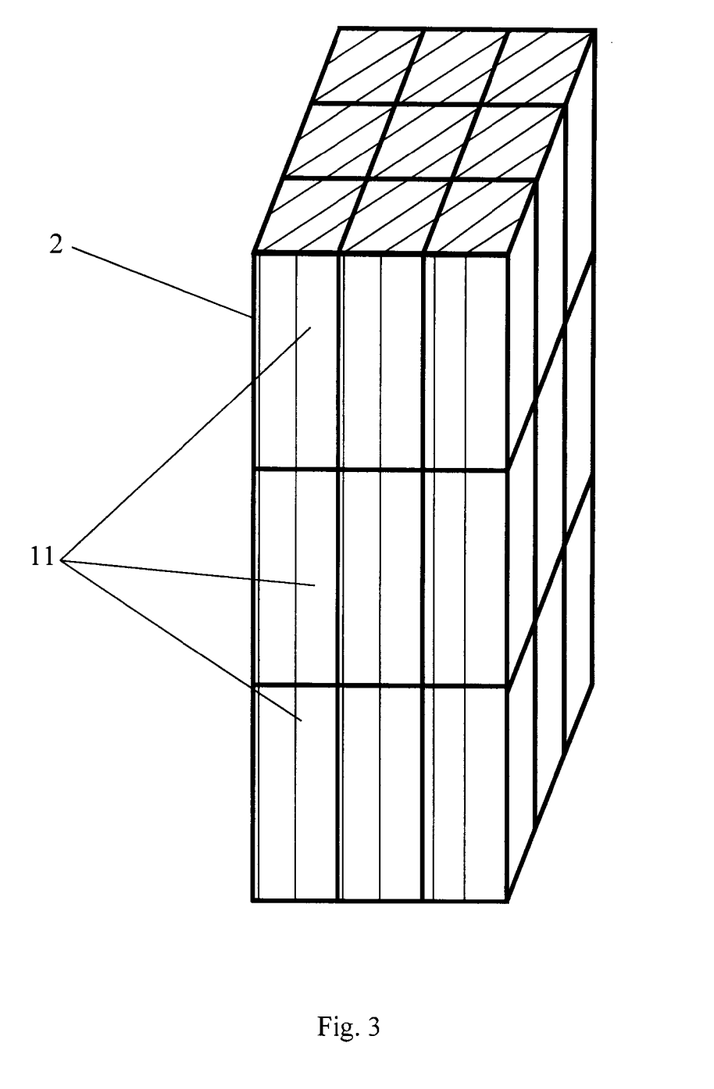

Shown in FIG. 3 is an assembly of contact devices in the form of wall 2, composed of standard blocks arranged in parallel to each other, wherein the blocks of identical contact elements 11 are assembled one upon another in one or more rows and are held together by spokes and vertical posts. The wall version shown consists of three rows of blocks comprising contact elements 11 identical in height and width.

Figure 4:
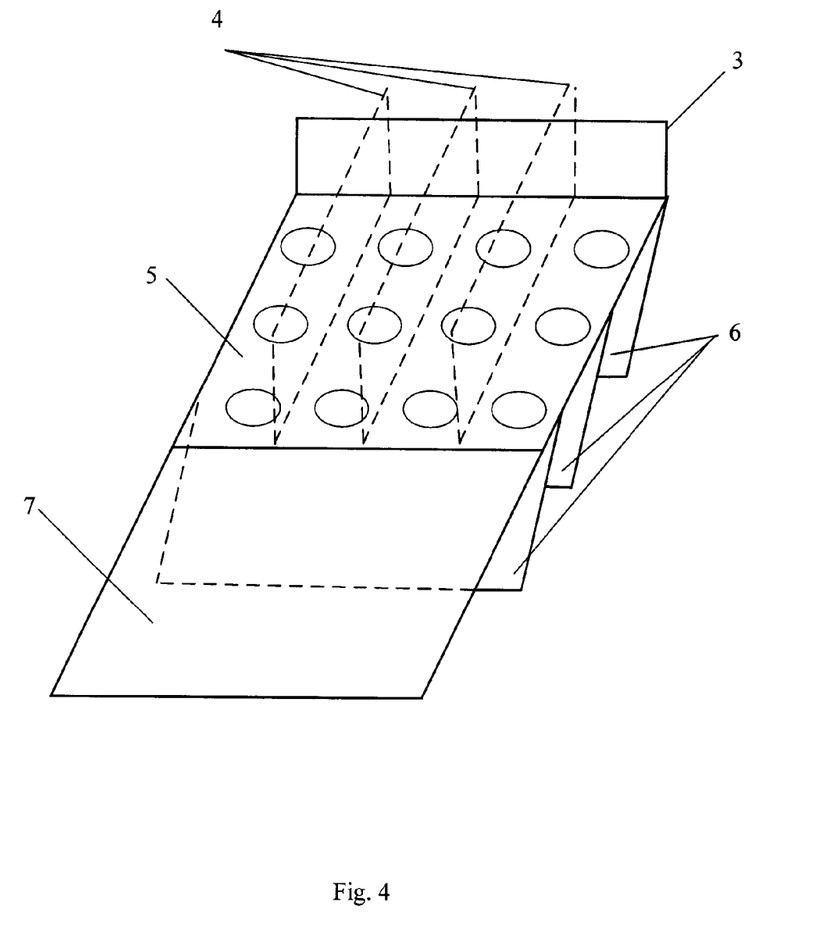

Shown in FIG. 4 is a distributing device assembly, such as intended for use with a gas/liquid system, arranged between adjacent contact devices in the form of walls, said device consisting of pressure strip 3, perforated part of the plate of liquid distributor 5, horizontal segmental baffle 7, and deflector plates 6, attached to the bottom of the perforated part of the plate of liquid distributor 5 at an acute angle and providing a uniform reflux on the lower wall contact elements across the wall width. The perforated part of the plate of liquid distributor 5 has openings for uniform distribution of the flowing-off liquid phase on the lower wall. From above, the perforated part of the plate of liquid distributor 5 is divided into rows, parallel to the wall length, by vertical support plates 4, resting on which are the blocks, forming a clearance between the upper wall elements and perforated part of the plate of liquid distributor 5 (vertical support plates 4 in FIG. 4 are shown in a dashed line).

Figure 5:
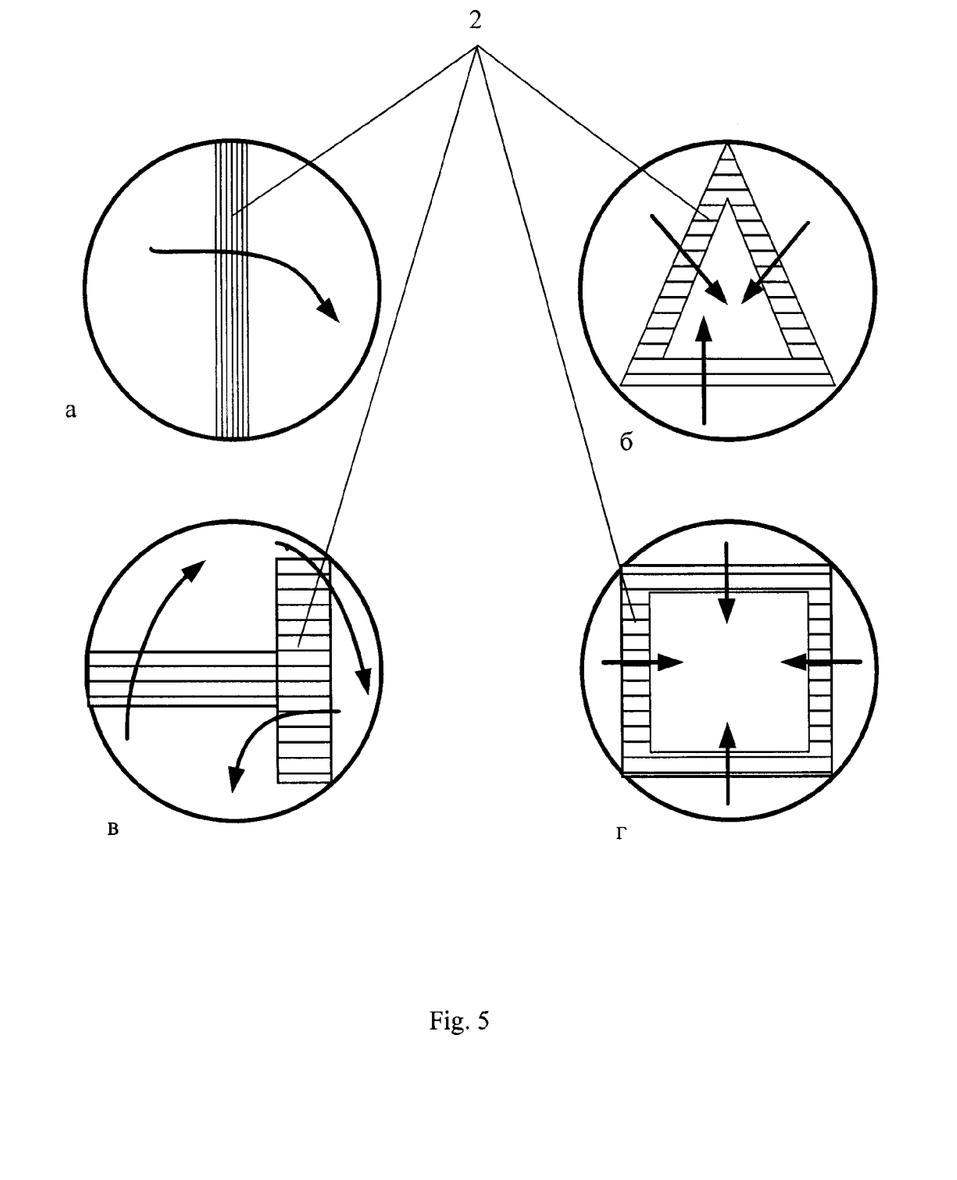

Shown in FIG. 5 are the options of contact devices in the form of walls 2, assembled from blocks and having a rectangular (a), triangular (b), T-shaped (c) or square (d) configuration of standard cross-section.

Hereby, the claimed contact device for carrying out heat/mass exchange and separation of phases in sectional cross-flow packed columns in gas/liquid and liquid/liquid systems enables to form a well-developed phase separation surface with simultaneous local stirring of phases on the strands of diamond-shaped openings in the packing, at the same time ensuring independence of flow areas of gaseous and liquid phase flows, which enables to improve heat/mass exchange efficiency factor of the contact device and optimize contact device dimensions, as well as increase mass exchange apparatus efficiency through replacement of the existing contact devices with the claimed ones, which will lead to cost saving on separation products in the column.

The invention claimed is:

1. A contact device for carrying out heat/mass exchange and separation of phases in sectional cross-flow packed columns in gas/liquid and liquid/liquid systems, said device including an aggregate of identical contact elements assembled in a block, wherein the contact elements are arranged in parallel to each other, and being distinguished in that the blocks of identical contact elements assembled one upon another in one or more rows are held together by spokes and vertical posts and form various solid figures, which are restricted on horizontal end faces by horizontal segmental baffles conjugated in an arc with the column body; arranged below the lower end face of the upper wall and the upper end face of the lower wall is an additional baffle, which is partially conjugated with a corresponding horizontal segmental baffle acting as a distributor for the liquid downflow and made in the form of a plate with free end bent upward in gas/liquid systems (a) and in liquid/liquid systems with dispersion of high-density liquid in the packing (b), and bent downward in systems with dispersion of high-density liquid in the packing (c), the bent free end forming a pressure strip; the bottom of liquid distributor plate is fitted with a perforated part arranged along the vertical projection of the wall; for systems (a) and (b), perforated parts of the plates are separated by rows of deflectors, parallel to wall width, attached to the bottom at an acute angle to the plate and facing the stream of gas or low-density liquid, while from above the perforated part of the plate is divided into rows, parallel to wall length, by vertical support plates, on which the blocks are resting, with formation of a clearance between the upper wall elements and perforated part of the distributor plate; for system (c), perforated parts of the plates are separated by rows of deflector plates parallel to wall width, attached to the bottom at an acute angle to the plate and facing the stream of high-density liquid, while from below the perforated part of the plates is divided into rows, parallel to wall length, by vertical support plates, on which the blocks are resting, with formation of a clearance between the lower wall elements and perforated part of the distributor; the space between the additional plate and the lower and upper walls is sealed by means of battens which prevent gas in the gas/liquid systems or continuous liquid phase in the liquid/liquid systems from penetration through the wall.

2. A contact device for carrying out heat/mass exchange and separation of phases in sectional cross-flow packed columns in gas/liquid and liquid/liquid systems according to claim 1, distinguished in that the identical contact elements represent a permeable corrugated plate with corrugation tilt angle of 45-60 degrees to the horizontal plane.

3. A contact device for carrying out heat/mass exchange and separation of phases in sectional cross-flow packed columns in gas/liquid and liquid/liquid systems according to claim 2, distinguished in that the permeable corrugated plates are made from an expanded plate 0.3-0.5 mm thick, with formation of mesh openings with strand size 4-12 mm and strand thickness 0.5-2.0 mm.

4. A contact device for carrying out heat/mass exchange and separation of phases in sectional cross-flow packed columns in gas/liquid and liquid/liquid systems according to claim 3, distinguished in that the corrugations of adjacent permeable corrugated plates are offset to 90 degrees and have contact with each other through corrugation crests, forming cavities with dimensions 3-5 times larger than those of the strand of permeable corrugated plate openings.

5. A contact device for carrying out heat/mass exchange and separation of phases in sectional cross-flow packed columns in gas/liquid and liquid/liquid systems according to claim 1, distinguished in that the vertical posts are in the form of channel member whose cheeks touch the wall and have contact with pressure strip of the distributor, forming a channel for liquid cross-flow, without overflowing, through the pressure strip.

6. A contact device for carrying out heat/mass exchange and separation of phases in sectional cross-flow packed columns in gas/liquid and liquid/liquid systems according to claim 1, distinguished in that the pressure strip height in millimeters is greater than the loss of pressure head of gas in the gas/liquid systems or low-density liquid in the liquid/liquid systems while said gas or liquid pass through the wall perpendicularly to the high-density liquid stream flowing down, or than the loss of pressure head of high-density liquid in the liquid/liquid systems while said liquid passes through the wall perpendicularly to the low-density liquid stream floating up in the liquid/liquid systems, expressed in millimeters of, respectively, high- or low-density liquid column.

7. A contact device for carrying out heat/mass exchange and separation of phases in sectional cross-flow packed columns in gas/liquid and liquid/liquid systems according to claim 1, distinguished in that the value of acute angle of the rows of deflectors to the plate facing the stream of gas in the gas/liquid systems or low-density liquid in the liquid/liquid systems is determined by the factors of viscosity and surface tension of the liquid downflow and provision of transition of liquid flowing down in the gas/liquid systems or low-density liquid floating up in the liquid/liquid systems from the mode of droplet flow through the holes in the perforated part of liquid distributor plate into the mode of film-like liquid flow over deflector plate, producing a uniform outflow of liquid along the entire length of deflector plate lower edge.

8. A contact device for carrying out heat/mass exchange and separation of phases in sectional cross-flow packed columns in gas/liquid and liquid/liquid systems according to claim 1, distinguished in that the ratio of block height, width, and length is $1:(1 \div 2):(2 \div 10)$.

9. A contact device for carrying out heat/mass exchange and separation of phases in sectional cross-flow packed columns in gas/liquid and liquid/liquid systems according to claim 1, distinguished in that the wall assembled from blocks has a rectangular, triangular, T-shaped or square configuration.

10. A contact device for carrying out heat/mass exchange and separation of phases in sectional cross-flow packed columns in gas/liquid and liquid/liquid systems according to claim 1, distinguished in that free cross-section of the wall makes at least 80%.

11. A contact device for carrying out heat/mass exchange and separation of phases in sectional cross-flow packed columns in gas/liquid and liquid/liquid systems according to claim 1, distinguished in that the blocks of identical contact elements, assembled one upon another in several rows, form a wall in the column section, with one row of the blocks offset relative to another by wall height, width, and length.

12. A contact device for carrying out heat/mass exchange and separation of phases in sectional cross-flow packed columns in gas/liquid and liquid/liquid systems according to claim 11, distinguished in that the offset of one row of the blocks relative to another can amount to 0.1-0.5 of block height.

13. A contact device for carrying out heat/mass exchange and separation of phases in sectional cross-flow packed columns in gas/liquid and liquid/liquid systems according to claim 1, distinguished in that the identical contact elements are fixed to each other in the block by means of spot welding or are stitched together by spokes with blanked ends.

14. A contact device for carrying out heat/mass exchange and separation of phases in sectional cross-flow packed columns in gas/liquid and liquid/liquid systems according to claim 1, distinguished in that mounting of the wall is performed from packing blocks immediately in the column section.

* * * * *